(12) United States Patent
Peng (10) Patent No.: US 11,602,015 B1
(45) Date of Patent: Mar. 7, 2023

(54) CONTROL AND PROTECTION CIRCUIT OF HEATER, TOWEL HEATING BARREL AND CONTROL METHOD THEREOF

(71) Applicant: Shenzhen Keenray Innovations Limited, Guangdong (CN)

(72) Inventor: Wenfeng Peng, Dongguan (CN)

( * ) Notice: Subject to any disclaimer, the term of this patent is extended or adjusted under 35 U.S.C. 154(b) by 0 days.

(21) Appl. No.: 17/730,219

(22) Filed: Apr. 27, 2022

(30) Foreign Application Priority Data

Apr. 6, 2022 (CN) .......................... 202220794164.6

(51) Int. Cl.
*H05B 1/02* (2006.01)
*H02H 1/00* (2006.01)
*H02H 5/04* (2006.01)

(52) U.S. Cl.
CPC ......... *H05B 1/0272* (2013.01); *H02H 1/0007* (2013.01); *H02H 5/047* (2013.01)

(58) Field of Classification Search
CPC ....................... H05B 1/0272; H02H 5/04–047
See application file for complete search history.

(56) References Cited

U.S. PATENT DOCUMENTS

| | | | |
|---|---|---|---|
| 8,481,895 B2 * | 7/2013 | Taylor | A47K 10/06 219/535 |
| 2006/0191901 A1 * | 8/2006 | Taylor | A47K 10/06 219/521 |
| 2008/0283516 A1 * | 11/2008 | Talle | F24D 19/1096 219/490 |
| 2017/0034873 A1 * | 2/2017 | Faulkner | H02H 5/04 |
| 2019/0239290 A1 | 8/2019 | Porter | |
| 2020/0006935 A1 * | 1/2020 | Francis | H02H 5/047 |

* cited by examiner

*Primary Examiner* — Jared Fureman
*Assistant Examiner* — Christopher J Clark (57) ABSTRACT

A control and protection circuit of a heater, a towel heating barrel and a control method thereof are provided in this disclosure. The control and protection circuit of the heater includes a power module, a power supply module, a control module, a temperature detection module and a heating module. The power module, the power supply module and the heating module are connected in series to supply power to the heating module, the control module is in signal connection with the power supply module to control on and off of the power supply module, and the temperature detection module in signal connection with the control module. The power supply module includes a high-temperature protection switch, a fuse and a relay. The control and protection circuit of the whole heater has three levels of protection, which can not only effectively provide high-temperature protection, but also ensure service life of the heater.

11 Claims, 7 Drawing Sheets

CONTROL AND PROTECTION CIRCUIT OF HEATER, TOWEL HEATING BARREL AND CONTROL METHOD THEREOF

TECHNICAL FIELD

The disclosure relates to heating devices, in particular to a control and protection circuit of a heater, a towel heating barrel and a control method of the towel heating barrel.

BACKGROUND ART

With continuous improvement of living standard, various new household appliances are constantly emerging, and a towel heating device is one of them. The towel heating device can heat towels, make the towels warm and soft, and facilitates more comfortable experience of users when they need to wipe their bodies after bathing. However, it is difficult for existing towel heating devices to control heating of the towels well, and a temperature of the towel tends to be too high when the towels are heated, which not only greatly degrades user experience, wastes a lot of energy, but also easily leads to fire and other dangerous situations. Therefore, towel heating devices on the market currently needs to be further improved.

SUMMARY

A control protection circuit of a heater and a towel heating barrel are provided in this disclosure, which solves a defect that towel heating barrels in the prior art lack an effective over-temperature protection circuit structure in operation.

A technical scheme adopted in the disclosure is as follows. A control and protection circuit of a heater includes a power module, a power supply module, a control module, a temperature detection module and a heating module. The power module, the power supply module and the heating module are connected in series to supply power to the heating module, the control module is in signal connection with the power supply module to control on and off of the power supply module, and the temperature detection module is in signal connection with the control module. The power supply module includes a high-temperature protection switch, a fuse and a relay. The high-temperature protection switch and the fuse are connected in series with the heating module, and the power supply module is electrically connected with the power module through the relay. The control module includes a control circuit, and the control circuit is connected with the relay in a controlled way, and controls on and off of the relay.

Further, the power supply module includes an input circuit, a step-down chip and an output circuit. The input circuit is electrically connected with the power module, the control module includes a control chip MCU, and the output circuit is electrically connected with the heating module and the control chip MCU.

Further, the power module is utility power, the step-down chip includes a fourth pin connected with a live wire and a third pin connected with a zero wire, and the fuse is electrically connected with the fourth pin. The input circuit includes a capacitor C1 connected in parallel with the third pin and the fourth pin, a resistor R1 and a capacitor C7 connected in series with the third pin, and a resistor R2 connected in parallel with the capacitor C7 and connected with the resistor R1.

Further, the step-down chip further includes a first pin and a second pin, and the output circuit comprises a zener diode D1, a zener diode D2, a resistor R3 and a capacitor C2 connected between the first pin and the second pin.

Further, the output circuit includes a first output terminal electrically connected with the control chip MCU. A step-down circuit is connected between the first output terminal and the first pin, and the step-down circuit includes a resistor R4, a resistor R5, a voltage regulator U8, a capacitor C3, a capacitor C4 and a capacitor C5. One end of the resistor R4 is connected with the step-down chip, and the other end of the resistor R4 is connected with a pin 3 of the voltage regulator U8. The resistor R5 is connected in parallel across the resistor R4, one end of the capacitor C3 is connected to the resistor R4 and the other end of the capacitor C3 is grounded, the first output terminal, the capacitor C4 and the capacitor C5 are connected to a pin 2 of the voltage regulator U8, and one end of each of the capacitor C4 and the capacitor C5 is grounded, and a pin 1 of the voltage regulator U8 is grounded.

Further, the control module includes a control chip MCU, a pin 1 of the control chip MCU is electrically connected with the first output terminal, a pin 2 of the control chip MCU is connected with a resistor R6 and a light emitting diode D3, a pin 4 of the control chip MCU is connected with a control switch, and a pin 5 of the control chip MCU is connected in series with a resistor R8, a triode Q and the relay, a pin 6 of the control chip MCU is connected with the temperature detection module, a pin 7 of the control chip MCU is connected in series with a resistor R7, a light emitting diode D4 and a light emitting diode D5, and a pin 8 of the control chip MCU is grounded.

A towel heating barrel is provided which includes the control and protection circuit.

Further, the towel heating barrel includes a liner, an upper cover, a shell and a base, and the heating module is a heating wire wound on the liner.

Further, the relay is arranged on the liner.

Further, the fuse and the high-temperature protection switch are arranged on the liner.

Further, the towel heating barrel further includes a display screen, the display screen is disposed at an upper end of the shell and further includes a control switch, a high-temperature indicator, a power indicator and a timing selection switch in control connection with the control module. Both the control switch and the timing selection switch are touch-sensitive switches, and a transparent cover is provided on a surface of the display screen.

A control method of the towel heating barrel includes following steps.

The control switch is pressed, after which the power indicator lights up, and the relay is closed. If the circuit is turned on normally, the control and protection circuit operates normally; and if there is a fault in the circuit, the high-temperature indicator flashes to give an alarm.

When it is detected that a temperature of the liner reaches 45° C., the high-temperature indicator is constantly on.

When it is detected that the temperature of the liner reaches a preset temperature T1, the control module sends a control signal to the relay, and the relay automatically turns off. At this time, a flow path between the power module and the power supply module is cut off to prevent the temperature of the liner from rising continuously, and to make the temperature of the liner start to decrease.

When it is detected that the temperature of the liner has dropped to a preset temperature T4, the temperature of the liner is maintained at the preset temperature T4 by continuously controlling starting and stopping of the relay.

When the temperature of the liner is maintained at the preset temperature T4 for 12 minutes, the relay is disconnected again, and the temperature of the liner continues to dropping.

When the temperature of the liner drops to a preset temperature T5, the temperature of the liner is maintained at the preset temperature T5 by continuously controlling the starting and stopping of the relay.

When it is detected that the temperature of the liner is maintained at the preset temperature T5 for one hour, the relay is completely disconnected and the towel heating barrel directly enters a standby state, and the power indicator goes out.

When it is detected that the temperature of the liner drops to 45° C., the high temperature indicator goes out. Compared with the prior art, in the disclosure, it is ensured that a heating temperature of the heater can be maintained in a controllable range by controlling the relay to turn on and off repeatedly by the control module, and the temperature of the heater can be prevented from exceeding the controllable range with a protection function of the high-temperature protection switch, the high-temperature protection switch can be restored to be closed, thus ensuring service life of the heater. Finally, with an automatic fusing role of the fuse, dangers caused by the temperature of the heater exceeding a safe temperature can be avoided, which provides a last protective barrier. With protection of the relay, the high-temperature protection switch and fuse, the control and protection circuit of the whole heater has three levels of protection, which can not only effectively provide high-temperature protection, but also ensure the service life of the heater.

The control method described above can flexibly realize heating and standby of the heating barrel. During a heating process, a warning can be emitted from the heating barrel to outside along with gradual heating of the liner. When the temperature of the liner reaches a warning temperature, the high-temperature indicator is constantly on to remind users to pay attention to safety. When an inner temperature rises to the preset temperature T1, the temperature of the liner is used to disinfect towel, and the relay is turned off at this time, so as to avoid waste of energy caused by continuous heating of the liner. The temperature of the liner is maintained at two temperature stages instead of subjected to a straight drop, which can keep the towel in a soft state for a longer time, make the towel soften more fully, and brings better user experience.

BRIEF DESCRIPTION OF THE DRAWINGS

In order to explain technical schemes in embodiments of the present disclosure more clearly, the drawings required in the description of the embodiments or the prior art will be briefly introduced below; obviously, the figures in the following description are only some embodiments of the present disclosure, and other figures can be obtained according to these drawings by those of ordinary skilled in the art without paying creative labor.

1. Fuse; 11. Second Output Terminal; 12. First Output Terminal; 2. Temperature Detection Module; 3. Relay; 4. Liner; 5. Upper Cover; 6. Shell; 7. Base; 8. Display Screen; 81. LED Window; 82. Control Switch; 83. High Temperature Indicator; 84. Timing Selection Switch.

DETAILED DESCRIPTION

In order to make technical problems to be solved by the disclosure, technical schemes and beneficial effects more clear, the disclosure will be further described in detail with reference to the drawings and examples. It should be understood that the specific embodiments described herein are only used to explain the present disclosure, and are not intended to limit the present disclosure.

Figure 1:
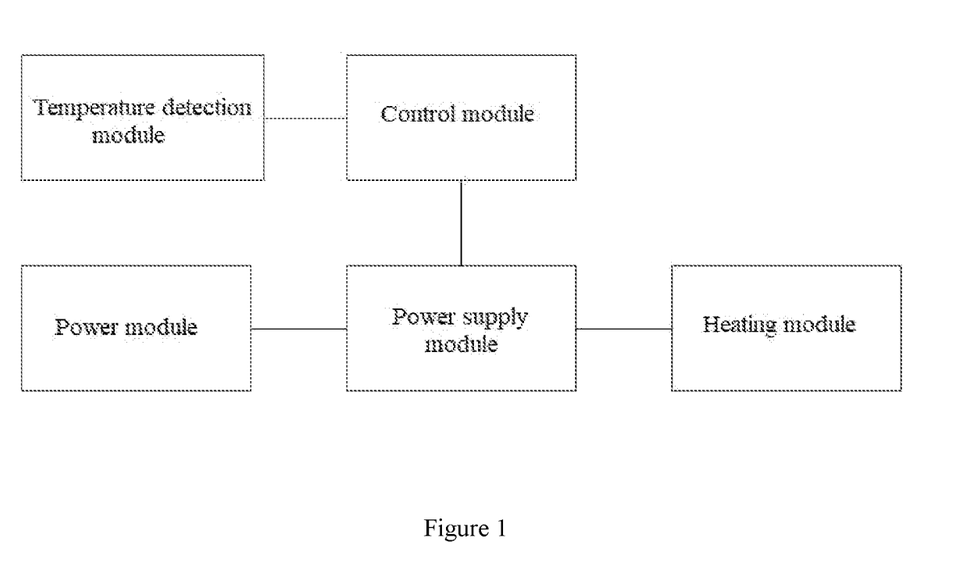
FIG. 1 is a schematic structural block diagram of a control and protection circuit in this disclosure.

In this disclosure, a control and protection circuit of a heater and a towel heating barrel including the control and protection circuit are proposed. Refer to FIG. 1, the control and protection circuit mainly includes following components: a power module, a power supply module, a control module, a temperature detection module 2 and a heating module. The power module, the power supply module and the heating module are connected in series. When the power supply module is turned on, the power supply module supplies power to the heating module through the power supply module. In general, the power module provides utility power. The power supply module stably supplies the utility power to the heating module after stepping down. The control module is in signal connection with the power supply module, and the control module is also in signal connection with the temperature detection module 2. The temperature detection module 2 detects a temperature of the heater in real time and feeds it back to the control module. The power supply module includes a high-temperature protection switch, a fuse 1 and a relay 3, the high-temperature protection switch and the fuse 1 are connected in series with the heating module. The power supply module is electrically connected with the power module through the relay 3. When the temperature exceeds a preset temperature T1, the control module sends a control signal to the relay 3, and the relay 3 automatically turns off. At this time, a flow path between the power module and the power supply module is cut off to prevent the temperature of the heater from rising continuously. However, when there is a special situation, such as a failure of the relay 3 or the temperature detection module 2, the relay 3 can't operates normally, and the temperature of the heater will continue to rising at this time; when the temperature exceeds a preset temperature T2, the high-temperature protection switch is automatically turned off, and the power supply module can't form a loop, so the heating module doesn't operate, thus functioning in high-temperature protection; and when the temperature decreases, the high-temperature protection switch is closed and the power supply module return to operate normally. Further, the fuse 1 is a third level of high-temperature protection. When the temperature exceeds a preset temperature T3 and reaches a fusing temperature of the fuse 1, the fuse 1 is directly fused at this time, a loop cannot be formed in the power supply module, and the heating module does not operate and cannot be recovered.

A heating temperature of the heater can be maintained in a controllable range by controlling the relay 3 to turn on and off repeatedly by the control module, and the temperature of the heater can be prevented from exceeding the controllable range with a protection function of the high-temperature protection switch, the high-temperature protection switch can be restored to be closed, thus ensuring service life of the heater. Finally, with an automatic fusing role of the fuse 1, dangers caused by the temperature of the heater exceeding a safe temperature can be avoided, which provides a last protective barrier. With protection of the relay 3, the high-temperature protection switch and fuse 1, the control and protection circuit of the whole heater has three levels of protection, which can not only effectively provide high-temperature protection, but also ensure the service life of the heater.

Figure 2:
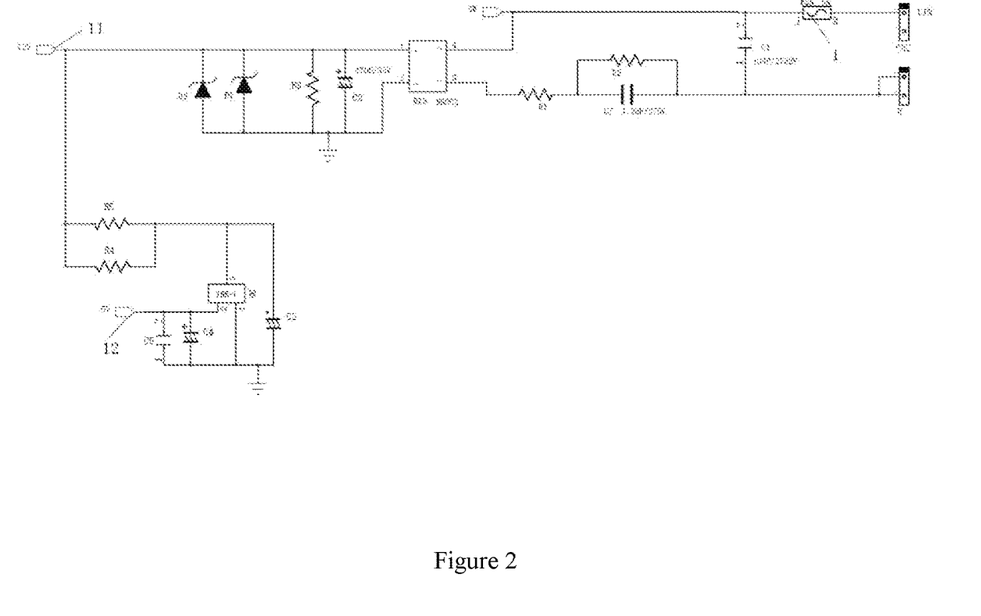
FIG. 2 is a schematic circuit diagram of a power supply module in this disclosure.

Further, referring to FIG. 2, the power supply module mainly includes an input circuit, a step-down chip and an output circuit. The input circuit is connected between the step-down chip and the power module, the output circuit includes a first output terminal 12 and a second output terminal 11, and the control module includes a control chip MCU. The first output terminal 12 of the output circuit is electrically connected with the control chip MCU, and the second output terminal 11 of the output circuit is electrically connected with the heating module, and the power supply module supplies power to the control chip MCU and the heating module through the first output terminal 12 and the second output terminal 11, respectively.

Specifically, the power supply module in this embodiment is utility power, and the step-down chip includes a first pin, a second pin, a third pin and a fourth pin. The fourth pin is connected with a live wire, the third pin is connected with a zero wire, one end of the fuse 1 is electrically connected with the fourth pin, and the other end of the fuse 1 is connected with the live wire. The input circuit includes a capacitor C1, a resistor R1, a capacitor C7 and a resistor R2. Two terminals of the capacitor C1 are connected in parallel to the live line and the zero line, and the resistors R1 and C7 are connected in series to the third pin. The resistors R2 and C7 are connected in parallel and connected to the resistor R1, the capacitor C1, the resistor R1, the capacitor C7 and the resistor R2 functions in filtering, buffering voltage, reducing radiation and protecting the input circuit.

The output circuit includes a zener diode D1, a zener diode D2, a resistor R3 and a capacitor C2 connected between the first pin and the second pin. The zener diode D1, the zener diode D2, the resistor R3 and the capacitor C2 function in stabilizing an output and filtering, and a 12V power supply voltage is stably output through the output circuit, which is used to supply power to the heating module.

Further, a step-down circuit is connected between the first output terminal 12 and the first pin. The step-down circuit includes a resistor R4, a resistor R5, a voltage regulator U8, a capacitor C3, a capacitor C4 and a capacitor C5. One end of the resistor R4 is connected with the step-down chip, and the other end of the resistor R4 is connected with a pin 3 of the voltage regulator U8. The resistor R5 is connected in parallel across the resistor R4, one end of the capacitor C3 is connected to the resistor R4 and the other end of the capacitor C3 is grounded, the first output terminal 12, the capacitor C4 and the capacitor C5 are connected to a pin 2 of the voltage regulator U8, and one end of each of the capacitor C4 and the capacitor C5 is grounded, and a pin 1 of the voltage regulator U8 is also grounded. The resistors R4 and R5 can function to reduce an input voltage of the voltage regulator U8, and a 5V voltage is output stably after passing through the voltage regulator U8. The 5V voltage is used to stably supply power to the control chip MCU, while the capacitors C3, C4 and C5 function in filtering.

Figure 3:
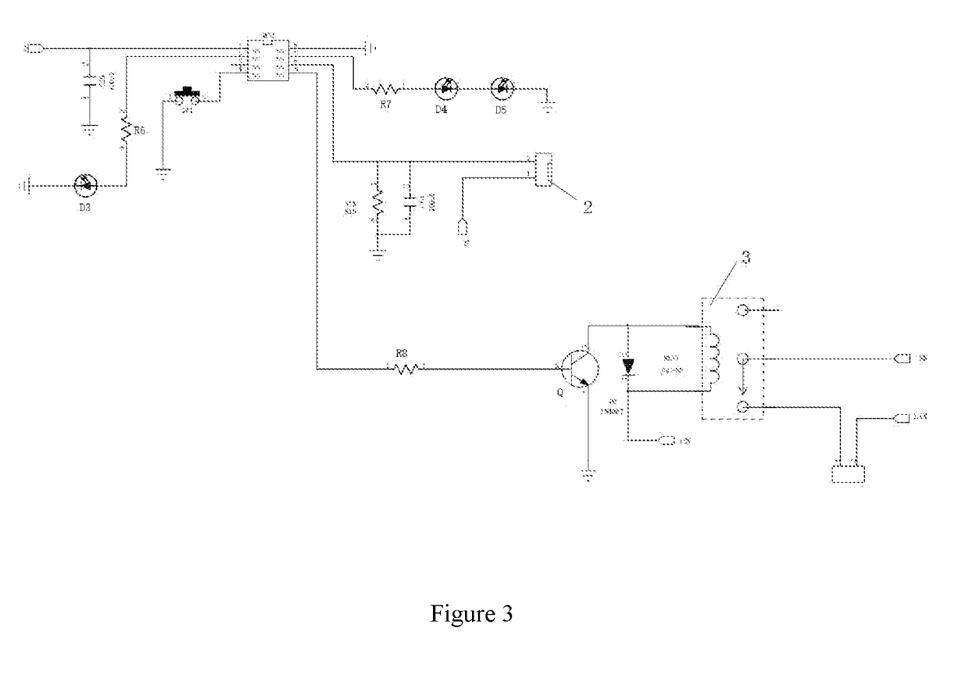
FIG. 3 is a schematic circuit diagram of a control module in this disclosure.

Referring to FIG. 3, the control module includes a control chip MCU. A pin 1 of the control chip MCU is electrically connected with the first output terminal 12, and a pin 2 of the control chip MCU is connected with a resistor R6 and a light-emitting diode D3, which is a power indicator, and the resistor R6 is a protection resistor of the light-emitting diode D3. A pin 4 of the control chip MCU is connected with a control switch, a pin 5 of the control chip MCU is connected in series with a resistor R8, a triode Q and a relay 3, and a pin 6 of the control chip MCU is connected with a temperature detection module 2. The control switch is a push-type switch, and when the control switch is pressed, the control chip MCU receives an on signal, controls the whole circuit to start to operate, and when a temperature exceeds the preset temperature T1, the control chip MCU sends a control voltage to a base of the triode Q, and the relay 3 turns off, the heater powers off and stops heating. A pin 7 of the control chip MCU is connected in series with a resistor R7, a light emitting diode D4 and a light emitting diode D5, the light emitting diode D4 and the light emitting diode D5 are high-temperature indicators. When the temperature detection module 2 detects that the temperature of the heater is too high, the control chip MCU controls the light emitting diodes D4 and D5 to emit light, and the resistor R7 also serves to protect the light emitting diodes D4 and D5. A pin 8 of the control chip MCU is grounded.

Figure 4:
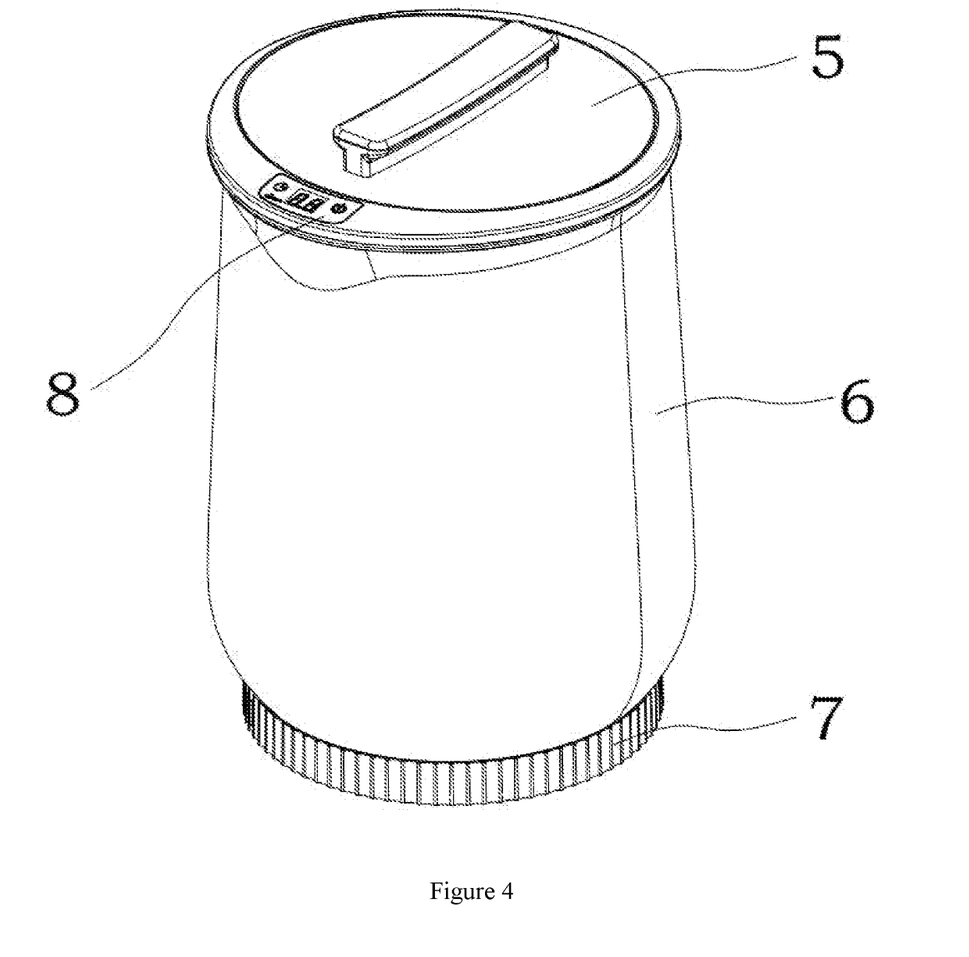
FIG. 4 is a three-dimensional structural diagram of a towel heating barrel in the disclosure.
Figure 5:
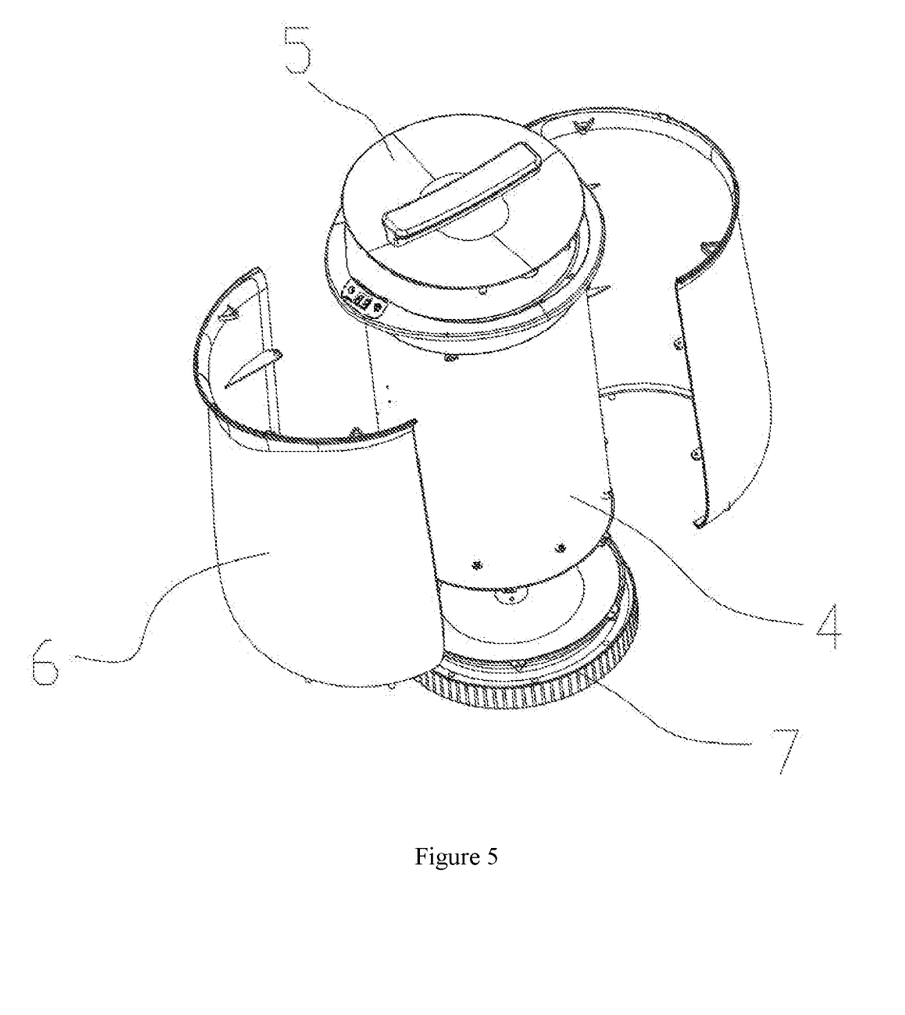
FIG. 5 is an exploded structural diagram of a towel heating barrel in this disclosure.
Figure 6:
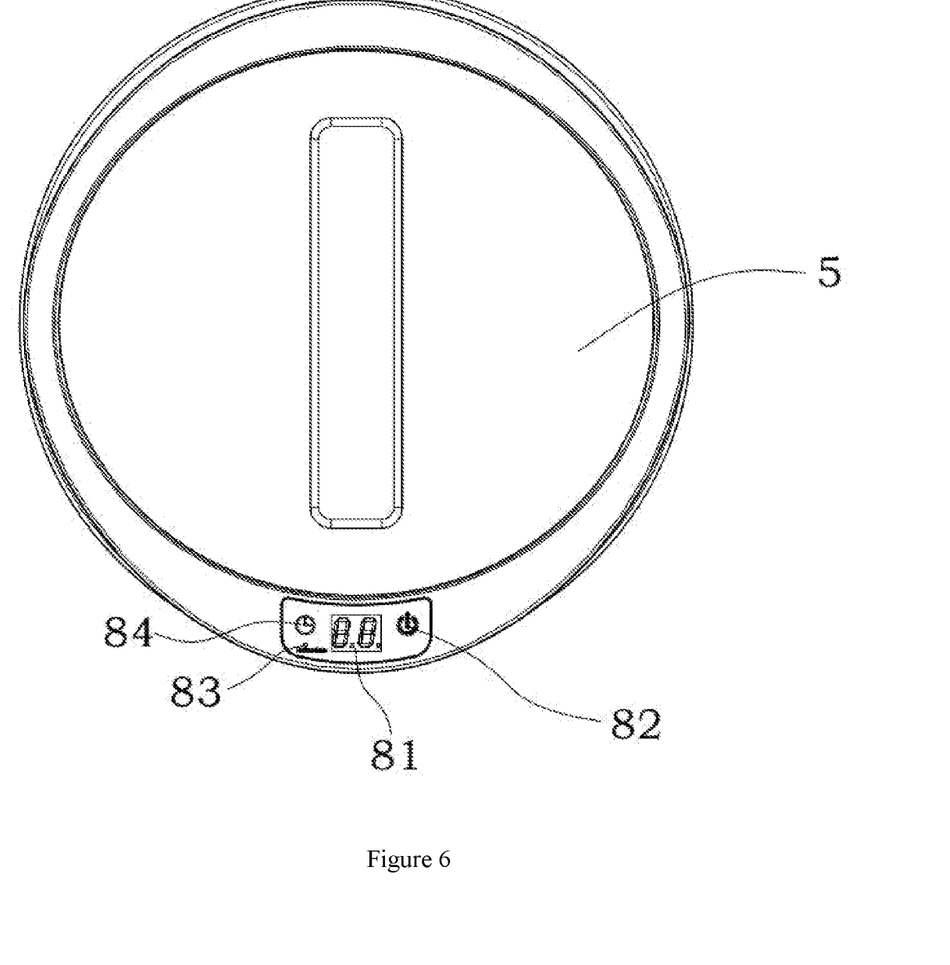
FIG. 6 is a vertical-view structural diagram of a towel heating barrel in this disclosure.

Further, a towel heating barrel is provided in this disclosure, which includes the above control and protection circuit. As shown in FIGS. 4, 5 and 6, the towel heating barrel mainly includes a liner 4, an upper cover 5, a shell 6 and a base 7. The base 7 is disc-shaped, and the shell 6 is cylindrical as a whole. The shell 6 is formed by splicing two housings with semicircular cross sections. The liner 4 is installed on the base 7, and a hollow annular cavity is formed between the liner 4 and the shell 6. The heating module is a heating wire wound on the liner 4, so that the liner 4 can be heated evenly. The relay 3, the fuse 1 and the high-temperature protection switch are riveted and fixed onto the liner 4, which can accurately detect and measure a temperature in the barrel.

Further, the towel heating barrel in this disclosure also includes a display screen 8. The display screen 8 is arranged at an upper end of the shell and also includes an LED window 81, a control switch 82, a high-temperature indicator 83 and a timing selection switch 84. The control module is in control connection with the LED window 81, the control switch 82, the high-temperature indicator 83 and the timing selection switch 84, both the control switch 82 and the timing selection switch 84 are touch-sensitive switches. The control module can recognize a control signal of the control switch 82, and power the towel heating barrel to operate, while the timing selection switch 84 can select different cycle durations. For example, the control module is provided with four operation duration options, which are 15 min, 30 min, 45 min and 60 min, respectively, and a user can select different duration modes to execute a towel heating program by touching the timing selection switch 84. The LED window 81 is used to display operation information of the towel heating barrel. Preferably, a surface of the display screen 8 is also provided with a transparent cover. The transparent cover is an integral large lens and its surface curvature is consistent with a curved surface of the shell, with an overall vision being integrated with the shell and upper and lower curvatures being consistent with shell sidelines. A color of a screen-printed background is black. A hole for the power indicator is defined on the control switch 82, and the power indicator is designed to be transparent, that is, the power indicator is formed with a logo of the control switch 82, and when the control switch 82 is touched, the power indicator arranged on the control switch 82 lights up synchronously.

Figure 7:
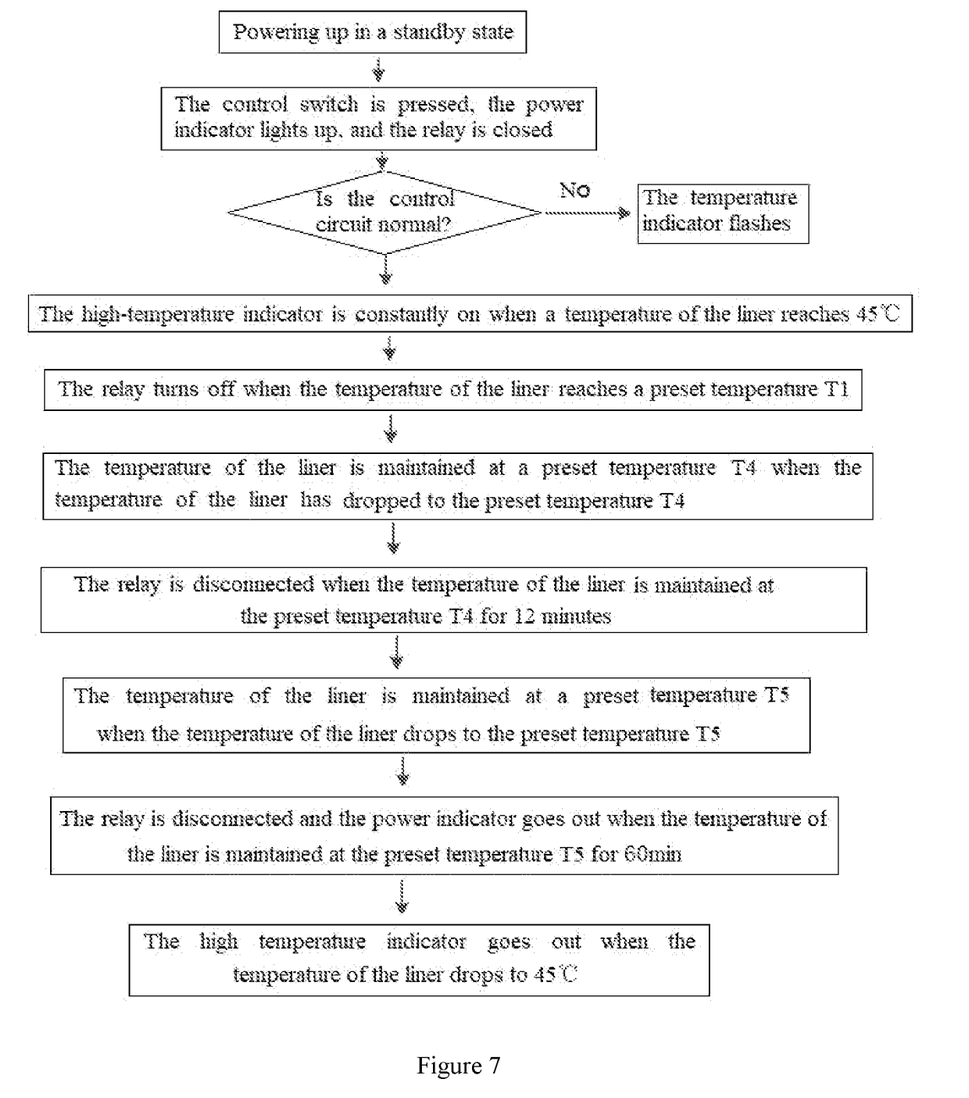
FIG. 7 is a flow chart of a control method of a towel heating barrel in the disclosure.

Further, a control method suitable for the towel heating barrel is further provided in this disclosure, as shown in FIG. 7, and the operation method includes steps S1 to S8.

In S1, the control switch is pressed, the power indicator lights up, and the relay 3 is closed. If the circuit is turned on normally, the control and protection circuit operates normally; and if there is a fault in the circuit, the high-temperature indicator flashes to give an alarm.

In S2, when it is detected that a temperature of the liner 4 reaches 45° C., the high-temperature indicator is constantly on.

In S3, when it is detected that the temperature of the liner 4 reaches a preset temperature T1, the control module sends a control signal to the relay 3, and the relay 3 automatically turns off. At this time, a flow path between the power module and the power supply module is cut off to prevent the temperature of the liner 4 from rising continuously, and to make the temperature of the liner 4 start to decrease.

In S4, when it is detected that the temperature of the liner 4 has dropped to a preset temperature T4, the temperature of the liner 4 is maintained at the preset temperature T4 by continuously controlling starting and stopping of the relay 3.

In S5, when the temperature of the liner 4 is maintained at the preset temperature T4 for 12 minutes, the relay 3 is disconnected again, and the temperature of the liner 4 continues to drop.

In S6, when the temperature of the liner 4 drops to a preset temperature T5, the temperature of the liner 4 is maintained at the preset temperature T5 by continuously controlling the starting and stopping of the relay 3.

In S7, when it is detected that the temperature of the liner 4 is maintained at the preset temperature T5 for one hour, the relay 3 is completely disconnected and the towel heating barrel directly enters a standby state, and the power indicator goes out.

In S8, when it is detected that the temperature of the liner 4 drops to 45° C., the high temperature indicator goes out.

It should be noted that when the user presses the control switch again during operation period of the heating barrel, it directly goes to step S8 for the heating barrel, that is, the towel heating barrel directly goes to the standby state, the power indicator goes out, and when it is detected that the temperature of the liner 4 drops to 45° C., the high-temperature indicator goes out.

The control method described above can flexibly realize heating and standby of the heating barrel. During a heating process, a warning can be emitted from the heating barrel to outside along with gradual heating of the liner 4. When the temperature of the liner 4 reaches a warning temperature, the high-temperature indicator is constantly on to remind users to pay attention to safety. When the temperature of the liner 4 rises to the preset temperature T1, the temperature of the liner 4 is enough for the user to use and is used to fully disinfect towel, the towel becomes soft and comfortable and the relay 3 is turned off at this time, so as to avoid waste of energy caused by continuous heating of the liner. Afterwards, the temperature of the liner 4 is maintained at two temperature stages instead of subjected to a straight drop, which can keep the towel in a soft state for a longer time, make the towel soften more fully, and brings better user experience.

It should be noted that the preset temperatures T1, T2, T3, T4 and T5 in the above embodiments can all be set as needed. In this embodiment, the preset temperature T1 is set to be 135° C., the preset temperature T2 is set to be 152° C., the preset temperature T3 is set to be 157° C., the preset temperature T4 is set to be 125° C., the preset temperature T5 is set to be 75° C., respectively.

The above description is only the preferred embodiments of the present disclosure, and it is not intended to limit the present disclosure. Any modification, equivalent substitution, improvement, etc. made within spirit and principle of this disclosure shall be encompassed within the protection scope of this disclosure.

The invention claimed is:

1. A control and protection circuit of a heater, comprising:
   a power module,
   a power supply module,
   a control module,
   a temperature detection module and
   a heating module, wherein the power module, the power supply module and the heating module are connected in series to supply power to the heating module, the control module is in signal connection with the power supply module to control on and off of the power supply module, and the temperature detection module is in signal connection with the control module;
   the power supply module comprises a high-temperature protection switch, a fuse and a relay, the high-temperature protection switch and the fuse being connected in series with the heating module, and the power supply module being electrically connected with the power module through the relay; and
   the control module comprises a control circuit, the control circuit being connected with the relay in a controlled way and controlling on and off of the relay;
   wherein the power supply module further comprises an input circuit and a step-down chip, the input circuit being electrically connected with the power module;
   the step-down chip comprises a third pin connected with a zero wire and a fourth pin connected with a live wire, and the fuse is electrically connected with the fourth pin; the input circuit comprises a capacitor C1 connected in parallel with the third pin and the fourth pin, a resistor R1 and a capacitor C7 connected in series with the third pin, and a resistor R2 connected in parallel with the capacitor C7 and connected with the resistor R1.

2. The control and protection circuit of the heater according to claim 1, wherein the power supply module comprises an output circuit, the control module comprising a control chip MCU, and the output circuit being electrically connected with the heating module and the control chip MCU.

3. The control and protection circuit of the heater according to claim 2, wherein the power module is configured to provide utility power.

4. The control and protection circuit of the heater according to claim 2, wherein the step-down chip further comprises a first pin and a second pin, and the output circuit comprises a zener diode D1, a zener diode D2, a resistor R3 and a capacitor C2 connected between the first pin and the second pin.

5. The control and protection circuit of the heater according to claim 4, wherein the output circuit comprises a first output terminal electrically connected with the control chip MCU, a step-down circuit is connected between the first output terminal and the first pin, and the step-down circuit comprises a resistor R4, a resistor R5, a voltage regulator U8, a capacitor C3, a capacitor C4 and a capacitor C5, one end of the resistor R4 being connected with the step-down chip and the other end of the resistor R4 being connected with a pin 3 of the voltage regulator U8; the resistor R5 being connected in parallel across the resistor R4; one end of the capacitor C3 being connected to the resistor R4 and an other end of the capacitor C3 being grounded; the first output terminal, the capacitor C4 and the capacitor C5 being connected to a pin 2 of the voltage regulator U8, one end of each of the capacitor C4 and the capacitor C5 being grounded, and a pin 1 of the voltage regulator U8 being grounded.

6. The control and protection circuit of the heater according to claim 5, wherein a pin 1 of the control chip MCU is electrically connected with the first output terminal, a pin 2 of the control chip MCU is connected with a resistor R6 and a light emitting diode D3, a pin 4 of the control chip MCU is connected with a control switch, and a pin 5 of the control chip MCU is connected in series with a resistor R8, a triode Q and the relay, a pin 6 of the control chip MCU is connected with the temperature detection module, a pin 7 of the control chip MCU is connected in series with a resistor R7, a light emitting diode D4 and a light emitting diode D5, and a pin 8 of the control chip MCU is grounded.

7. A towel heating barrel, comprising a control and protection circuit,
wherein the control and protection circuit comprises
a power module,
a power supply module,
a control module,
a temperature detection module, and
a heating module, wherein the power module, the power supply module and the heating module are connected in series to supply power to the heating module, the control module is in signal connection with the power supply module to control on and off of the power supply module, and the temperature detection module is in signal connection with the control module;
the power supply module comprises a high-temperature protection switch, a fuse and a relay, the high-temperature protection switch and the fuse being connected in series with the heating module, and the power supply module being electrically connected with the power module through the relay; and
the control module comprises a control circuit, the control circuit being connected with the relay in a controlled way and controlling on and off of the relay;
wherein the power supply module further comprises an input circuit and a step-down chip, the input circuit being electrically connected with the power module;
the step-down chip comprises a fourth pin connected with a live wire and a third pin connected with a zero wire, and the fuse is electrically connected with the fourth pin; the input circuit comprises a capacitor C1 connected in parallel with the third pin and the fourth pin, a resistor R1 and a capacitor C7 connected in series with the third pin, and a resistor R2 connected in parallel with the capacitor C7 and connected with the resistor R1.

8. The towel heating barrel according to claim 7, wherein the towel heating barrel comprises a liner, an upper cover, a shell and a base, and the heating module is a heating wire wound on the liner.

9. The towel heating barrel according to claim 8, wherein the relay, the fuse and the high-temperature protection switch are all arranged on the liner.

10. The towel heating barrel according to claim 8, further comprising a display screen, wherein the display screen is disposed at an upper end of the shell and further comprises a control switch, a high-temperature indicator, a power indicator and a timing selection switch in control connection with the control module, both the control switch and the timing selection switch being touch-sensitive switches, and a transparent cover being provided on a surface of the display screen.

11. A control method of a towel heating barrel, wherein the towel heating barrel comprises
a display screen,
a liner,
an upper cover,
a shell,
a base, and
a control protection circuit, the relay, fuse and high-temperature protection switch being all arranged on the liner, and the control protection circuit comprising a power module, a power supply module, a control module, a temperature detection module and a heating module, the control module being connected with the power supply module in signal to control on and off of the power supply module; the power supply module comprising a high-temperature protection switch, a fuse and a relay, the high-temperature protection switch and the fuse being connected in series with the heating module, and the power supply module being electrically connected with the power module through the relay; the display screen being provided with a control switch, a high-temperature indicator, a power indicator and a timing selection switch in control connection with the control module;
the control method comprises following steps:
pressing the control switch, after which the power indicator lights up and the relay is closed, and if the circuit is turned on normally, the control and protection circuit operates normally, and if there is a fault in the circuit, the high-temperature indicator flashes to give an alarm;
making the high-temperature indicator constantly on when it is detected that a temperature of the liner reaches 45° C.;
sending, by the control module, a control signal to the relay when it is detected that the temperature of the liner reaches the preset temperature T1, so that the relay automatically turns off, a flow path between the power module and the power supply module is cut off to prevent the temperature of the liner from rising continuously, and to make the temperature of the liner start to decrease;
maintaining the temperature of the liner at a preset temperature T4 by continuously controlling starting and stopping of the relay when it is detected that the temperature of the liner has dropped to the preset temperature T4;
disconnecting the relay again so that the temperature of the liner continues to dropping when the temperature of the liner is maintained at the preset temperature T4 for 12 minutes;
maintaining the temperature of the liner at a preset temperature T5 by continuously controlling the starting and stopping of the relay when the temperature of the liner drops to the preset temperature T5;

completely disconnecting the relay so that the towel heating barrel directly enters a standby state and the power indicator goes out when it is detected that the temperature of the liner is maintained at the preset temperature T5 for one hour; and making the high temperature indicator go out when it is detected that the temperature of the liner drops to 45° C.

\* \* \* \* \*